UNITED STATES PATENT OFFICE.

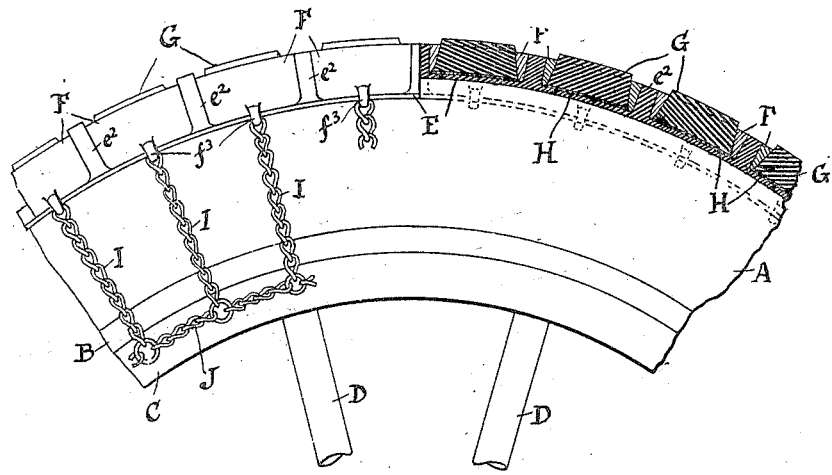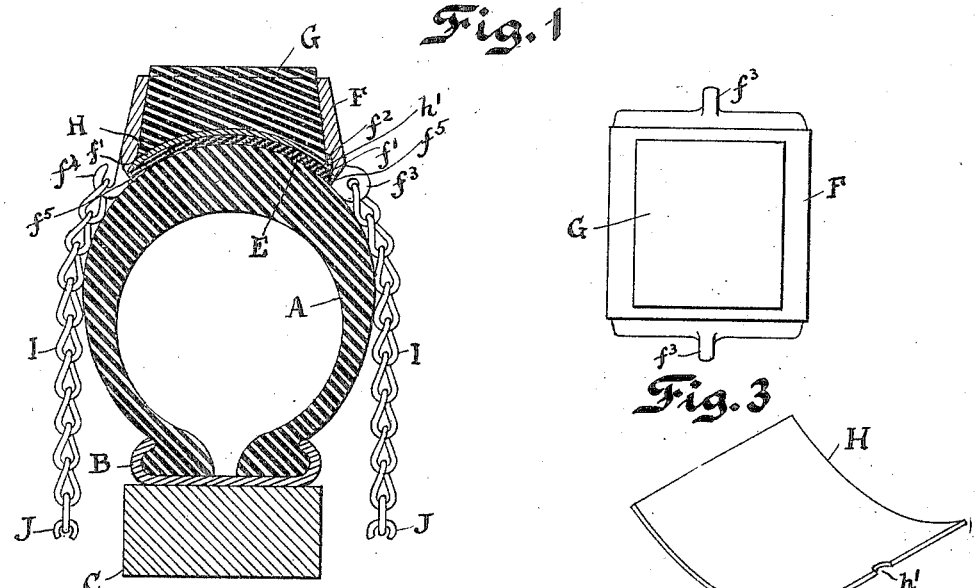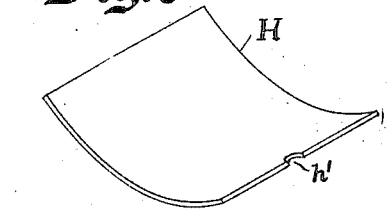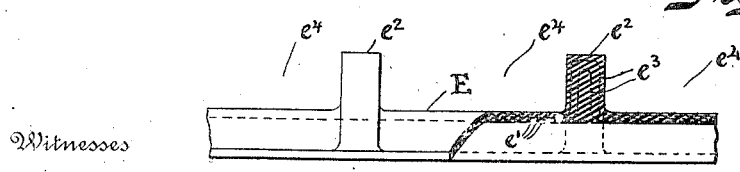

RUDOLPH B. HARTMAN, OF MILWAUKEE, WISCONSIN.

DEMOUNTABLE TREAD FOR TIRES.

1,234,331.  Specification of Letters Patent.  Patented July 24, 1917.

Application filed September 3, 1914. Serial No. 859,977.

*To all whom it may concern:*

Be it known that I, RUDOLPH B. HARTMAN, a citizen of the United States and resident of Milwaukee, Wisconsin, have invented a Demountable Tread for Tires, of which the following is a specification.

This invention relates to vehicle tires, and the object which I have in view is to provide a covering or tread over the ordinary rubber tire to protect it against puncture, tearing, wear, and injuries of all kinds. While my invention is applicable to various kinds of tires, it is particularly adapted to use with pneumatic tires.

A further object of the invention is to provide a removable armored covering which contains elements adapted to take the principal part of the wear and to be replaced from time to time as they become worn out.

According to my invention I provide a series of blocks which are adapted to be mounted on the face of the tire, each block comprising a metallic frame inclosing antislip material such as rubber, means for securing said blocks in place, and a flexible band or strap placed directly upon the face of the tire between it and the blocks forming a seat for the latter, said strap having a series of upstanding lugs which form sockets or pockets between them in which said blocks are adapted to be seated.

The nature of my invention will be more exactly understood by reference to the following detailed description thereof taken in connection with the accompanying drawings, wherein Figure 1 is a side view of a portion of a pneumatic tire and wheel-rim having my demountable tread mounted thereon; the right-hand portion of the tread being shown in a longitudinal central section;

Fig. 2 is a transverse section through the tire and rim of the wheel of the same parts, the plane of section being taken through one of the tread-blocks;

Fig. 3 is a plan view of one of the tread-blocks separately;

Fig. 4 is a perspective view of the removable closure plate for one of said blocks; and Fig. 5 is a side elevation, partly in longitudinal section, of the flexible seat-strap separately.

In these drawings the reference characters are used to designate the same parts in each figure.

For purposes of illustration there are shown a conventional form of pneumatic tire A, metal felly-clip B, rim C and spokes D. For carrying out my invention I provide first, a flexible fabric band or strap E, which encircles and fits closely upon the face of the tire; a portion of this band is shown separately in Fig. 5 and it consists preferably of one or more canvas straps $e^1$ which are incorporated with rubber in a manner similar to a tire casing; and said band has at regular intervals thereon upstanding lugs $e^2$ which are also preferably of rubber, and it will be noted that one or more of the canvas bands $e^1$ are formed with loops $e^3$ which pass up into the lugs $e^2$ and thereby strengthen them against shearing.

The upstanding lugs $e^2$ form between them a series of pockets $e^4$, in which are adapted to fit neatly the tread-blocks, as shown in Fig. 1. Each tread-block consists of a hollow-metal frame F, within which is disposed a wear-block G, which preferably consists of rubber but may be formed also of paper, wood, or other suitable antislip-material. Although the outer face of the block G is shown as projecting beyond that of the frame F, this is not considered of importance as it will become ultimately worn down in use level with the edges of the frame, and it is to be understood that the metal edge of the frame F and resilient supporting block G act together to form a wear-face adapted to grip the roadway and prevent skidding.

As will be seen from the sectional views, the frame F is itself open at the bottom and a removable closure-plate H is provided, which is curved to conform with the tire-tread, as shown separately in perspective in Fig. 4. This plate is intended to be made of spring-steel or like material so that it will snap into place against the edges of the abutment-grooves $f^1$, and when in place its arch-shaped form prevents it from becoming displaced or bent inwardly by any pressure upon the block G, or by any thrust of the pointed end of a nail or other object which may pierce the block G, but can not pierce the plate H. The plate H may be provided at one side with a notch $h^1$ and the frame F with a small recess $f^2$ immediately under said notch, so that the plate H can be readily removed by inserting a pointed instrument in the notch and prying it out. When so removed the wear-block G can be readily dropped out through the innerside of the frame F by reason of its tapered form which prevents the wear-block from falling out through the outer side.

Suitable means are provided for holding the tread-blocks in place as for example by radially extending chains I on opposite sides of the tire, each chain engaging an eye $f^3$ or hook $f^4$ formed on the lateral edge of each frame F, and these radial chains I being united together by an encircling chain J on the side of the wheel-rim. My invention is not confined to this mode of securing the wear-block which is merely shown by way of illustration. The lugs $e^2$ may have their outer edges flush with the rims F as illustrated on the right of Fig. 1, or may extend slightly above them as shown on the left, as preferred. These lugs have the double function of holding the tread-blocks in their proper positions and preventing wear and friction between them, and also of forming themselves additional wear-surfaces supplementing the blocks G. The lugs $f^3$ are preferably recessed as shown in Fig. 2 forming transverse rabbets $f^5$ which abut against the edges of the band E and hold the parts in relative position.

In the same manner various changes and modifications in the constructions as herein shown may be adopted without departing from the spirit of my invention, and I wish it understood therefore that the latter is not otherwise limited than by the proper scope of my claims.

Having thus described my invention, what I claim as new and desire to secure by Letters Patent is:

1. In a device of the class described, a tread-block comprising a hollow metal frame adapted to sit on the face of the tire and open on its outer and inner faces, a wear-block of antislip-material inclosed in said frame, and a readily detachable resilient metal bottom plate forming a closure for the inner face of said frame, said resilient plate bearing against opposite inner walls of the frame and being arched against the wear-block, whereby said wear-block is held in place against inward pressure.

2. In a device of the class described, a tread-block comprising a hollow metal frame adapted to sit on the face of the tire and open on its outer and inner faces, a wear-block of antislip-material inclosed in said frame, and a readily detachable closure-member consisting of an arched spring metal plate, said frame having grooves in its inner walls into which said closure-member may be sprung.

3. In a device of the class described, a tread-block comprising a hollow metal frame adapted to sit on the face of the tire and open on its outer and inner faces, a wear-block of antislip-material inclosed in said frame, and a removable closure-member consisting of an arched metal spring-plate fitting the open inner face of said frame and having its edges engaged in undercut grooves on the sides of said frame, whereby said spring-plate is adapted to snap into place therein.

4. A demountable tread for tires comprising, in combination, a flexible fabric band adapted to encircle closely the outer face of a tire and having a plurality of upstanding resilient lugs thereon spaced at regular intervals, forming pockets between them, and a plurality of tread-blocks seated in said pockets and bearing against adjacent lugs upon each side to thereby form a continuous tread.

5. A demountable tread for tires comprising, in combination, a flexible fabric band adapted to encircle closely the outer face of a tire and having a plurality of upstanding resilient lugs thereon spaced at regular intervals, forming pockets between them, and a plurality of tread-blocks seated in said pockets, each tread-block comprising a hollow metal frame inclosing a wear-block of antislip-material.

6. A demountable tread for tires comprising, in combination, a flexible fabric band encircling and fitting closely on the face of a tire and having a plurality of upstanding rubber lugs thereon at regular intervals forming pockets between said lugs, a set of tread-blocks fitting neatly in said pockets and bearing upon either side against the adjacent rubber lugs to thereby form a continuous tread, and a flexible means for securing said tread-blocks against displacement.

7. A demountable tread for tires comprising, in combination, a combined-fabric-and-rubber flexible band encircling and fitting closely on the face of the tire and having a plurality of upstanding rubber lugs thereon at regular intervals forming pockets between said lugs, a set of tread-blocks fitting neatly in said pockets, and means for securing said tread-blocks against displacement; each tread-block comprising a hollow metal frame, a wear-block of antislip-material inclosed thereby, said wear-block being removable only through the inner side of said frame, and an arched metal spring-plate forming a closure for said inner side of said frame and adapted to snap into place thereon.

In witness whereof I have signed my name in the presence of two witnesses.

RUDOLPH B. HARTMAN.

Witnesses:
E. FRANKENSTEIN,
JOSEPH H. McGINN.